(12) United States Patent
Al-Anzi

(10) Patent No.: US 8,663,082 B2
(45) Date of Patent: Mar. 4, 2014

(54) GAS BURIAL DISPOSAL CAPSULES

(76) Inventor: Bader Shafaqa Al-Anzi, Safat (KW)

( * ) Notice: Subject to any disclaimer, the term of this patent is extended or adjusted under 35 U.S.C. 154(b) by 238 days.

(21) Appl. No.: 13/297,080

(22) Filed: Nov. 15, 2011

(65) Prior Publication Data

US 2013/0053611 A1 Feb. 28, 2013

Related U.S. Application Data

(63) Continuation-in-part of application No. 13/219,561, filed on Aug. 26, 2011, now Pat. No. 8,413,968.

(51) Int. Cl.
*B09B 1/00* (2006.01)

(52) U.S. Cl.
CPC .............. *B09B 1/008* (2013.01); *B09B 1/004* (2013.01)
USPC .......................................................... 588/250

(58) Field of Classification Search
CPC ................................ B09B 1/004; B09B 1/008
USPC .................................................. 588/249, 250
See application file for complete search history.

(56) References Cited

U.S. PATENT DOCUMENTS

| | | | |
|---|---|---|---|
| 3,864,443 A * | 2/1975 | Hopkins | ........................ 264/42 |
| 4,155,868 A | 5/1979 | Kaplan et al. | |
| 5,102,005 A | 4/1992 | Trussler | |
| 5,587,191 A | 12/1996 | Donsbach et al. | |
| 6,284,293 B1 | 9/2001 | Crandall et al. | |
| 6,296,786 B1 | 10/2001 | Wada et al. | |
| 7,073,584 B2 * | 7/2006 | Reddy et al. | .................. 166/293 |
| 7,390,418 B2 | 6/2008 | Martin et al. | |
| 7,488,703 B2 * | 2/2009 | Rubin | ........................... 504/359 |
| 2008/0135245 A1* | 6/2008 | Smith et al. | ................ 166/280.2 |

OTHER PUBLICATIONS http://www.huffingtonpost.com/2010/01/24/bubble-wrap-celebrates-50_n_434685.html (selected portions) printed Oct. 18, 2013.*

* cited by examiner

*Primary Examiner* — John Kreck
(74) *Attorney, Agent, or Firm* — Richard C. Litman

(57) ABSTRACT

The water aeration capsules provide a quick and highly portable system for aerating polluted water. The capsules contain bubbles of air, oxygen, and/or other gas(es) surrounded by a water soluble membrane. The capsules are ballasted to sink. Magnetically attractive ballast elements may be provided, and a magnetic sheet may be placed on the bottom of a smaller body of water to enhance the settling of the capsules. The gas burial disposal capsules may be formed of non-degradable material for substantially permanent gas storage, or of degradable material to allow the gases to slowly permeate the surrounding earth for slow and relatively harmless release. The gas may be pressurized within the capsules to approximately the pressure of the surrounding earth.

8 Claims, 8 Drawing Sheets

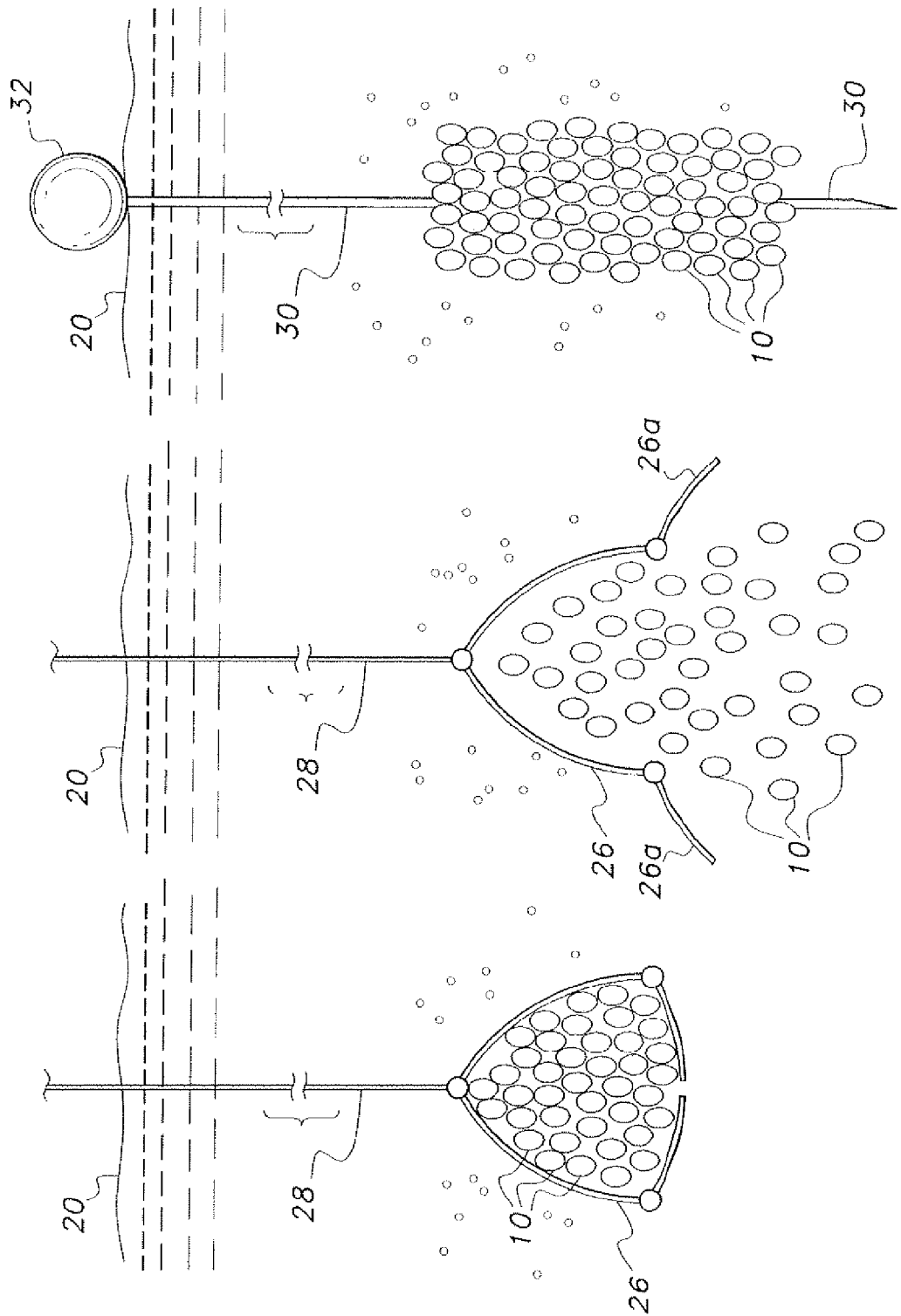

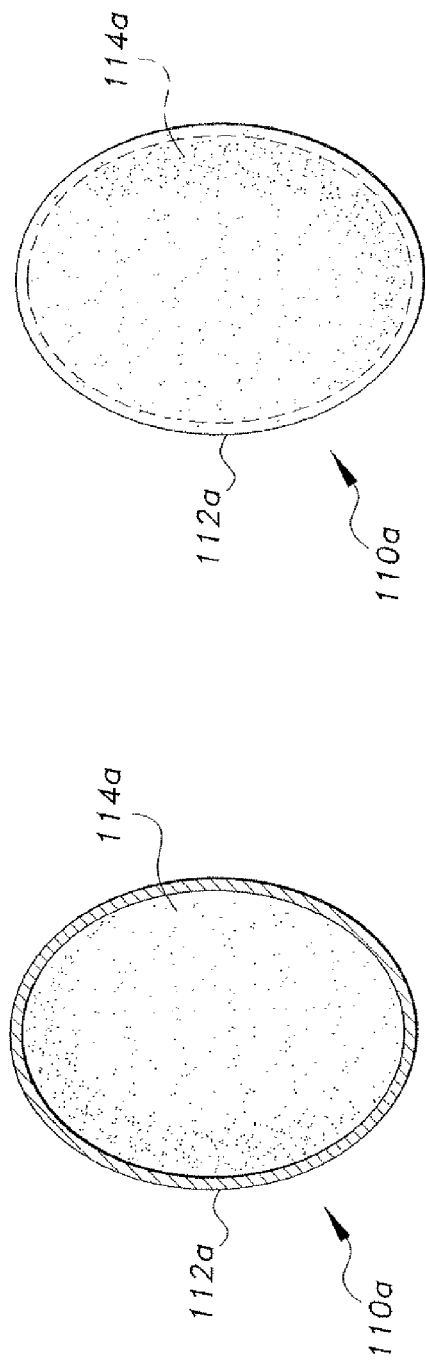
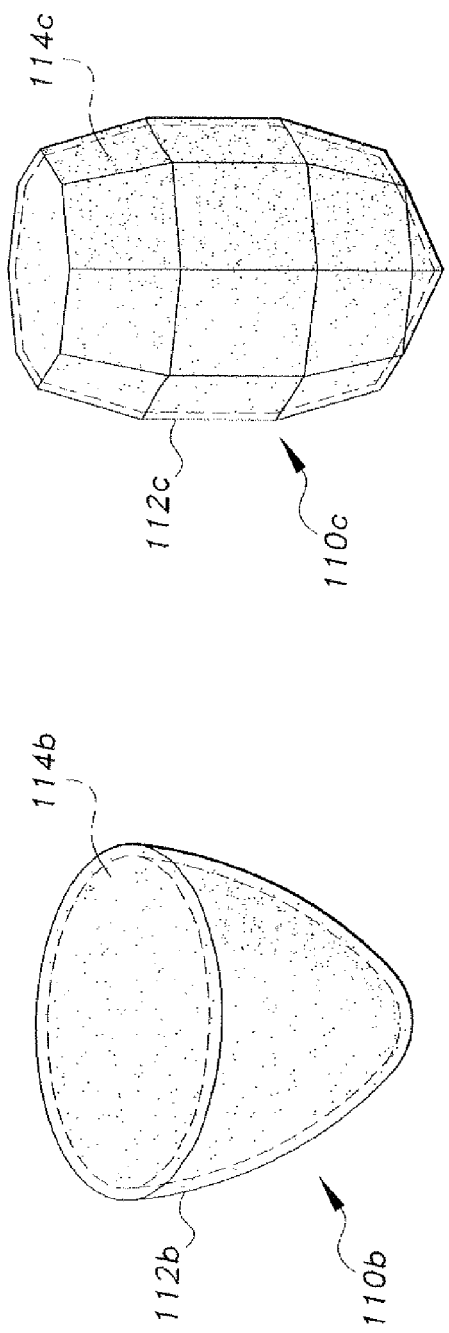
Fig. 9A  Fig. 9B  Fig. 9C  Fig. 9D

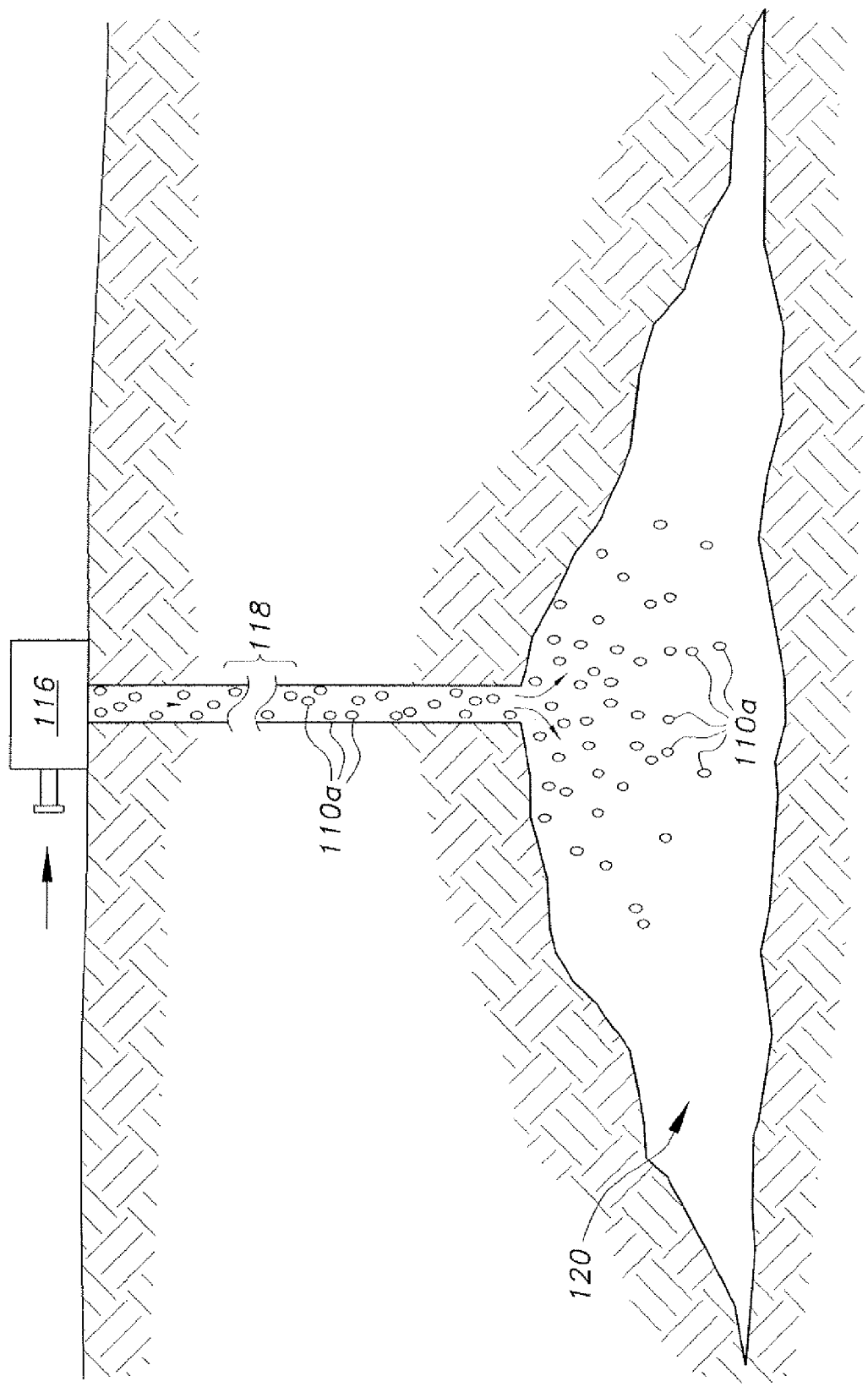

GAS BURIAL DISPOSAL CAPSULES

CROSS-REFERENCE TO RELATED APPLICATIONS

This application is a continuation in part of U.S. patent application Ser. No. 13/219,561, filed on Aug. 26, 2011.

BACKGROUND OF THE INVENTION

1. Field of the Invention

The present invention relates generally to water treatment and gas disposal systems, and particularly to various embodiments of water aeration capsules and gas burial disposal capsules and dispensing means therefor.

2. Description of the Related Art

The contamination of various bodies of water by various means is an increasingly serious problem worldwide. Perhaps the most widespread contaminants are organic materials that enter the water system due to pollution from human habitation either directly or indirectly, e.g., pollution from farms and the like. Such pollution can affect inland fresh water supplies (lakes and rivers), and can also be carried to the sea by inland rivers and waterways or by direct discharge of sewage and/or other pollutants into the sea. Organic material in the sewage of treatment plants is another example of such pollution, albeit contained for processing. The biochemical processes that occur in water due to such organic pollution are well known to decrease the oxygen content of the water, thereby reducing or perhaps even destroying fish and other aquatic life in the contaminated body of water. Even if some fish remain in the polluted water, they are almost certainly unfit for human consumption if caught.

It is generally considered that the most effective means of eliminating such pollutants in contaminated water is by bacteriological processing, wherein bacteria process the contaminants to break them down into harmless organic materials. However, such bacteria are aerobic, i.e., they require oxygen for their metabolism. This is well known in the sewage treatment field, where water is commonly treated by aeration after solids are removed by settling or other means. Such aeration is generally accomplished by mechanical means, e.g., pumping the water up for dispensing into the air from spray booms and nozzles, or perhaps by forcing air through underwater pipes for the air to bubble up through the water. Such mechanical systems are relatively costly to operate and require relatively high energy and manpower costs. Even if such systems were less costly to operate, a huge drawback is that they cannot be readily transported to a pollution site for operation at that site. Rather, the water must be transported to the location of the aeration system, a process that is clearly unworkable on a very large scale and/or over very long distances.

In addition to the above problems relating primarily to the aquatic and marine environments, numerous gases are formed as a result of various industrial processes. Many of these gases are released into the atmosphere where they create various environmental problems, e.g., respiratory difficulties for many people, damage to the natural and man-made environment, etc. Neutralizing or destroying many of these unwanted and hazardous gases is often quite difficult, and in some cases (e.g., burning or oxidizing the gases) may result in even more hazardous and/or undesirable gases as an end result or as a byproduct.

Thus, gas burial disposal capsules solving the aforementioned problems are desired.

SUMMARY OF THE INVENTION

The present invention relates to capsules that may be used for water aeration and to capsules that may be used for gas burial disposal (disposal of the gas by burying capsules enclosing the gas). The water aeration capsules comprise several embodiments of water soluble capsules containing oxygen, air, and/or other gas(es) therein. The capsules may be formed to have any practicable shape or configuration. The gas impervious outer shell, skin, or membrane is formed of a water soluble material, such as various salts, sugars, and/or water soluble polymers, e.g., various polyvinyl alcohols, and numerous other conventional materials and substances. Regardless of the specific shape or configuration of the capsules and/or the material used to form the outer shell or skin, all of the capsules include some form of ballast material, resulting in the capsules having negative net buoyancy, i.e., a capsule specific gravity greater than one. The ballast material may comprise any of a number of different materials, so long as the specific gravity of the ballast material is greater than one. Examples of such ballast material are various non-toxic metals, sand, clay, and/or fish bait or other food for aquatic animals. The use of such aquatic animal food as ballast provides a twofold benefit for the capsules, in that (1) it causes the capsules to sink, and (2) provides nutrition for aquatic animal life in the treated body of water, once the capsules have dissolved.

Various means for dispensing the capsules, or enhancing their dispensing, are also disclosed herein. At least one embodiment comprises magnetically attractive ballast elements in the capsules, and a magnetic plate, grid, or the like placed in the bottom of the body of water being treated. Such a system is well suited for use in smaller and shallower ponds, such as sewage treatment ponds or relatively small contaminated bodies of open water. The magnetic sheet placed at the bottom of the pond during operation may be recovered after the aeration process has been completed, thus also recovering the magnetically attractive ballast elements therewith. The capsules may be dispensed by any practicable means by a mobile carrier, e.g., one or more persons dispensing the capsules by hand from the shore, a boat, or by underwater diving, or perhaps on a larger scale from a ship(s) or aircraft.

The gas burial disposal capsules comprise relatively small capsules configured for burial beneath the surface of the ground, where they store hazardous and/or undesirable gases to obviate atmospheric contamination and pollution. The gas burial disposal capsules may be formed of non-degradable materials, such as corrosion-resistant (i.e., "stainless") steel or various plastics, to assure that the encapsulated gas cannot escape for any foreseeable period of time. Alternatively, the gas burial capsules may be formed of degradable metal or plastic materials that allow the capsule walls to be breached after some predetermined period of time, thereby allowing the encapsulated gas to slowly permeate the surrounding soil or earth, where its undesirable effects are dissipated over a relatively long period of time. The gas burial disposal capsules may be pressurized with gas(es) and buried at a depth where the ambient pressure developed by the surrounding earth is substantially the same as the pressure of the gas(es) within the capsules, thereby permitting the capsule walls to be formed of relatively thin and fragile material(s).

These and other features of the present invention will become readily apparent upon further review of the following specification and drawings.

BRIEF DESCRIPTION OF THE DRAWINGS

FIG. 3A is a diagrammatic environmental elevation view showing a plurality of water aeration capsules according to the present invention, contained within a remotely actuated dispensing device.

FIG. 3B is a diagrammatic elevation view of the dispensing device of FIG. 3A, showing the release and dispersal of the water aeration capsules from the opened dispensing device.

FIG. 4 is an environmental elevation view of a plurality of water aeration capsules according to the present invention, disposed on an alternative dispensing device and mobile carrier therefor.

FIG. 9A is a front view in section of a first embodiment of a gas burial disposal capsule according to the present invention, illustrating its internal structure.

FIG. 9B is a front view of the gas burial disposal capsule of FIG. 9A, illustrating its external structure.

FIG. 9C is a perspective view of a second embodiment of a gas burial disposal capsule according to the present invention, illustrating its external structure.

FIG. 9D is a perspective view of a third embodiment of a gas burial disposal capsule according to the present invention, illustrating its external structure.

FIG. 10 is an environmental elevation view in section showing the dispersal of a plurality of the gas burial disposal capsules according to the present invention in an underground pocket or deposit.

FIG. 11 is an environmental elevation view in section showing the dispersal of a plurality of the gas burial disposal capsules according to the present invention in an open pit, such as a landfill or the like.

Similar reference characters denote corresponding features consistently throughout the attached drawings.

DETAILED DESCRIPTION OF THE PREFERRED EMBODIMENTS

Figure 1A:
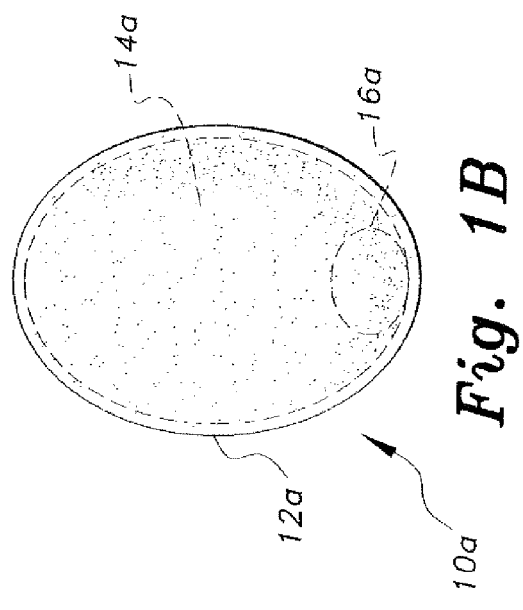
FIG. 1A is a front view in section of a first embodiment of a water aeration capsule according to the present invention, illustrating its internal structure.
Figure 1B:
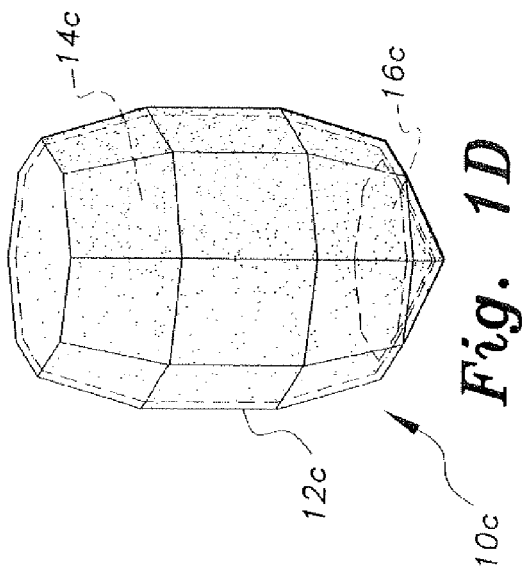
FIG. 1B is a front view of the water aeration capsule of FIG. 1, illustrating its external structure.
Figure 1C:
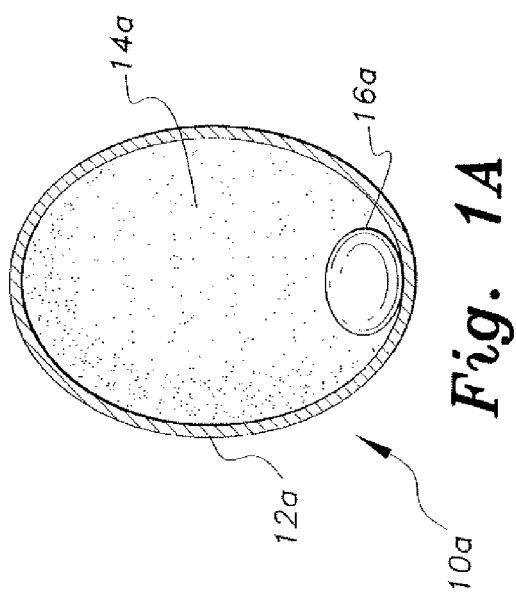
FIG. 1C is a top perspective view of a second embodiment of a water aeration capsule according to the present invention, illustrating its external structure.
Figure 1D:
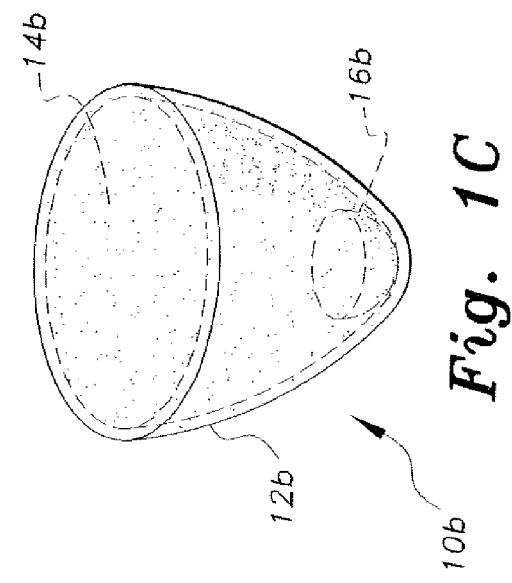
FIG. 1D is a perspective view of a third embodiment of a water aeration capsule according to the present invention, illustrating its external structure.

The water aeration capsules comprise several different configurations of capsules that are each adapted for treating a body of water with air, oxygen, and/or other gas(es). FIGS. 1A and 1B of the drawings provide a front view in section and a front view of a first embodiment of a water aeration capsule 10a, while FIGS. 1C and 1D illustrate alternative embodiment capsules 10b and 10c. The only difference between the various capsules 10a, 10b, and 10c is their shape or geometric configuration, the basic structure comprising a closed shell surrounding an internal volume containing a gas and a ballast weight or element therein, which is the same for all of the various configurations or embodiments of the capsule.

The capsule 10a comprises a thin, closed water soluble shell, skin or membrane 12a, defining a gas-filled internal volume 14a. A ballast element 16a is placed within the internal volume, the ballast element having sufficient mass to result in a collective specific gravity greater than one for the entire capsule 10a and its gas-filled interior, i.e., the capsule 10a will sink when dropped into a body of water. The corresponding water aeration capsules 10b of FIG. 1C and 10c of FIG. 1D have substantially the same structure, differing only in their geometric shapes. The capsule 10b of FIG. 1C includes a shell, skin, or membrane 12b enclosing a gas-filled volume 14b and a ballast element 16b, while the capsule 10c of FIG. 1D includes a shell, skin, or membrane 12e enclosing a gas-filled volume 14e and a ballast element 16c. The shapes of the various water aeration capsules 10a through 10c are exemplary, and it should be understood that virtually any practicable shape may be used to form such a water aeration capsule.

The capsule shell, skin or membrane 12a (or 12b, 12c for the capsules 10b, 10c of FIGS. 1C, 1D) may be formed of any suitable water soluble material that is substantially impervious to the gas contained therein until dissolved in water. Various salts, sugars, and/or water soluble polymers, such as polyvinyl alcohol or the like, may be used to form the outer shell or skin 12a. All of these substances are conventional, and accordingly no further disclosure need be provided. It should be understood that the above-listed materials for forming the shell or membrane 12a of the capsule 10a are exemplary, and other suitable conventional water soluble materials may be used in lieu thereof. The capsule shell, membrane or skin may be flexible or brittle, depending upon the material(s) used. If brittle materials are used, the shell may break or be crushed by water pressure at relatively deep levels, but this is certainly acceptable as it will release the air or other gas contained therein, the broken portions of the shell dissolving later. Generally, the capsule membrane, skin, or shell has insufficient strength to contain air or gas at much higher than ambient pressure, but the air or gas may be placed within the capsule at somewhat higher than ambient pressure (i.e., a pressurized capsule), if the shell, skin or membrane has sufficient strength.

The intended purpose of the water aeration capsule 10a, and other capsule embodiments, is to treat a body of contaminated or polluted water with oxygen in order to promote the growth of desirable bacteria that, in turn, process the pollutants in the water, changing the processed pollutants to less harmful organic materials. Accordingly, a preferred gas with which the capsules 10a (or 10b, 10c, etc.) may be filled is oxygen, but standard air (approximately 21% oxygen and 78% nitrogen, with traces of other gases) may be used economically. It will be understood that the terms "aerate" and "aeration" as used herein are intended to describe the release of any practicable gas within a body of water by means of the aeration capsules described herein. Other gases, e.g., carbon dioxide, pure nitrogen, hydrogen, and/or inert gases such as helium, argon, and neon, may be used in lieu of or in addition to oxygen or air as desired for purposes other than oxygenating the water. The principle of encapsulating a gas and ballasting the capsule to cause it to sink in a body of water and then dissolve to release the gas remains the same for any gas contained in the capsule.

Figure 8:
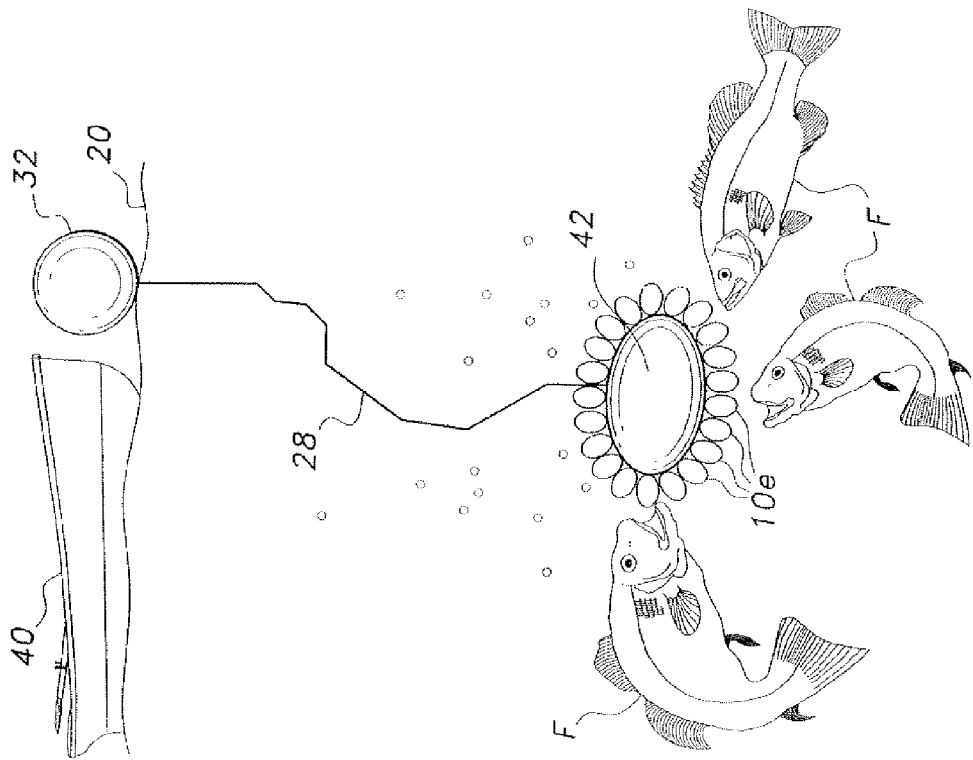
FIG. 8 is an environmental elevation view showing a plurality of water aeration capsules according to the present invention, another alternative dispensing device, and another alternative mobile carrier.

The ballast weight or element 16a (or 16b, 16c, etc.) may be formed of any suitable material, so long as it provides sufficient mass to cause its respective capsule to sink in a body of water. The ballast element may be made from very common and inexpensive materials, e.g., a non-toxic metal(s) such as iron, steel, copper, brass, etc., or non-metallic materials, such as sand, clay, ceramic pellets or stone or gravel, etc. Another alternative is to use some form of food for aquatic animals as the ballast means. Such an embodiment is illustrated in FIG. 8 and discussed further below.

Figure 2:
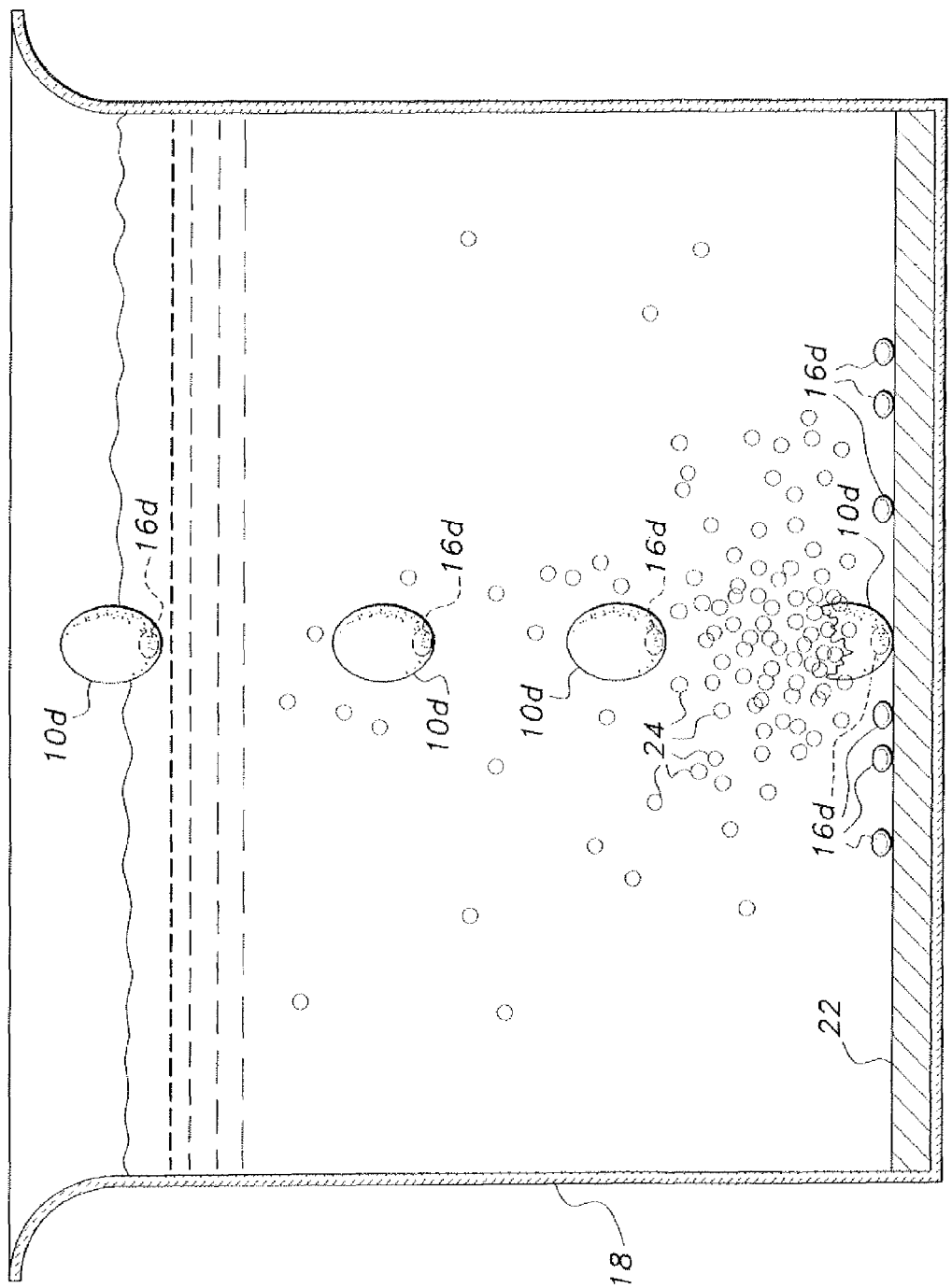
FIG. 2 is an environmental elevation view of a plurality of magnetically attractive water aeration capsules according to the present invention being dispensed into a body of water having a magnetic plate at the bottom thereof, showing progressive dissolution of the capsules in the body of water.

FIG. 2 provides an illustration of a water aeration capsule 10d having an alternative ballast weight or element 16d therein formed of a magnetically attractive material, e.g., ferromagnetic iron, steel, etc. A container 18 containing water 20 therein, an aquarium or fish tank, includes a magnetically attractive sheet 22 in the bottom thereof. The magnetically attractive sheet may be in the form of a plate, as shown, or a grid or thin sheet of material. The magnetically attractive sheet 22 may be electromagnetically activated, if sufficient electrical insulation is provided for the device. Otherwise, latent magnetism of the magnetized sheet 22 will suffice. The principle illustrated in FIG. 2 may be applied to small natural or man-made bodies of water as well, with the beaker-like container 18 merely being exemplary as a demonstration of the principle.

The capsules 10d may be deployed or dispensed into the water 20 in any conventional manner. In the case of a small container of water, or even a relatively small pond or narrow body of water, the capsules 10d (and others described herein) may be deployed by hand by personnel on shore. As the capsules 10d and their magnetically attractive ballast elements 16d approach the bottom of the container 18 as they sink, their magnetic ballast elements 16d are attracted to the magnetic plate or sheet 22 in the bottom of the container 18, thereby increasing the sink rate of the capsules 10d to better assure that the capsules will reach the bottom of the container 18 before being breached and releasing the gas 24 contained therein. The magnetic sheet 22 may be recovered after the body of water 20 has been aerated, the magnetically attractive ballast elements 16d clinging magnetically to the sheet 22 for recovery and reuse.

FIGS. 3A and 3B illustrate an exemplary means of releasing a relatively large number of water aeration capsules in a larger body of water, e.g., larger pond, lake, ocean, river, etc. A mobile carrier comprising a remotely openable container 26 is provided and filled with water aeration capsules 10. (The generic reference numeral 10 will be used to designate the water aeration capsules of FIGS. 3A through 7, as the capsules 10 may be of any of the configurations illustrated in FIGS. 1A through 2, or any other desired configuration.) The container 26 may be a wire basket or the like, or may be formed of unbroken panels. It is not necessary to protect the capsules 10 contained therein, as the intent is for them to dissolve in the water once they have been submerged. The mobile carrier or container 26 is lowered into the water 20 on a rope, cable, chain, or other extended element 28, to the depth desired. When the container 26 has reached the desired depth, the lower doors or panels 26a may be opened remotely by conventional means, e.g., a secondary mechanical rope, cable, or line, or via an electrical signal or radio signal to the appropriate conventional actuation mechanism on or in the container 26. When the doors or panels 26a are opened, as shown in FIG. 3B, the capsules 10 are released to dissolve in the water 20 to release their aeration gases.

FIG. 4 provides an illustration of another alternative means for deploying the capsules 10 in the water 20. In this embodiment, the mobile carrier comprises a stick, rod, or the like 30 suspended from a float or buoy 32. (It will be seen that the container 26 of FIGS. 3A and 3B may be suspended from the rod and float of FIG. 4, if desired.) The capsules 10 of FIG. 4 are not contained within an enclosure, but are adhesively secured to the stick or rod 30 and to one another by water soluble adhesive, e.g., by wheat flour paste, etc. Alternatively, they may be gathered on the stick or rod 30 by a porous fabric or wire mesh or screen (not shown) surrounding the capsules. The stick or rod 30 arrangement has the advantage of simplicity in that no remote actuation of container doors or the like is required for the release of the capsules 10.

Figure 6:
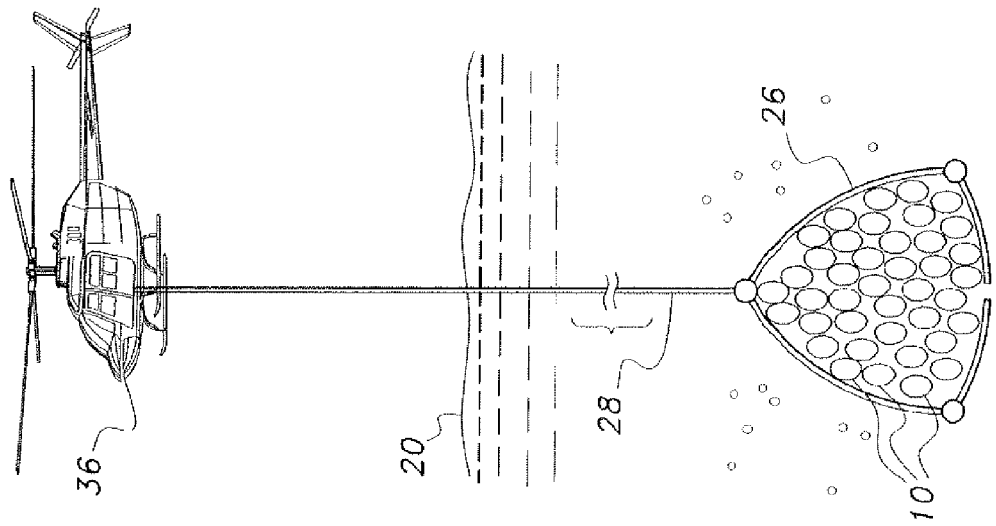
FIG. 6 is an environmental elevation view showing the water aeration capsules and dispensing device of FIG. 3A, and another alternative mobile carrier.
Figure 5:
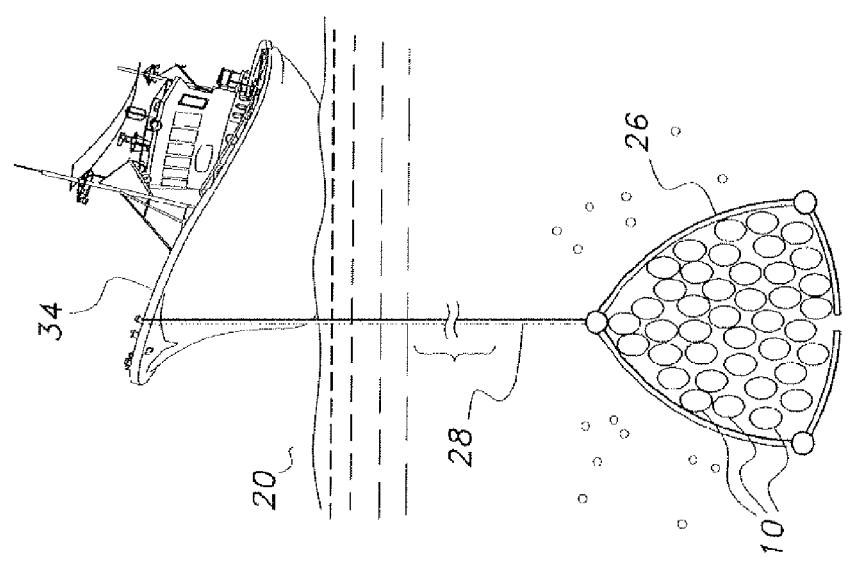
FIG. 5 is an environmental elevation view showing the water aeration capsules and dispensing device of FIG. 3A, and an alternative mobile carrier.
Figure 7:
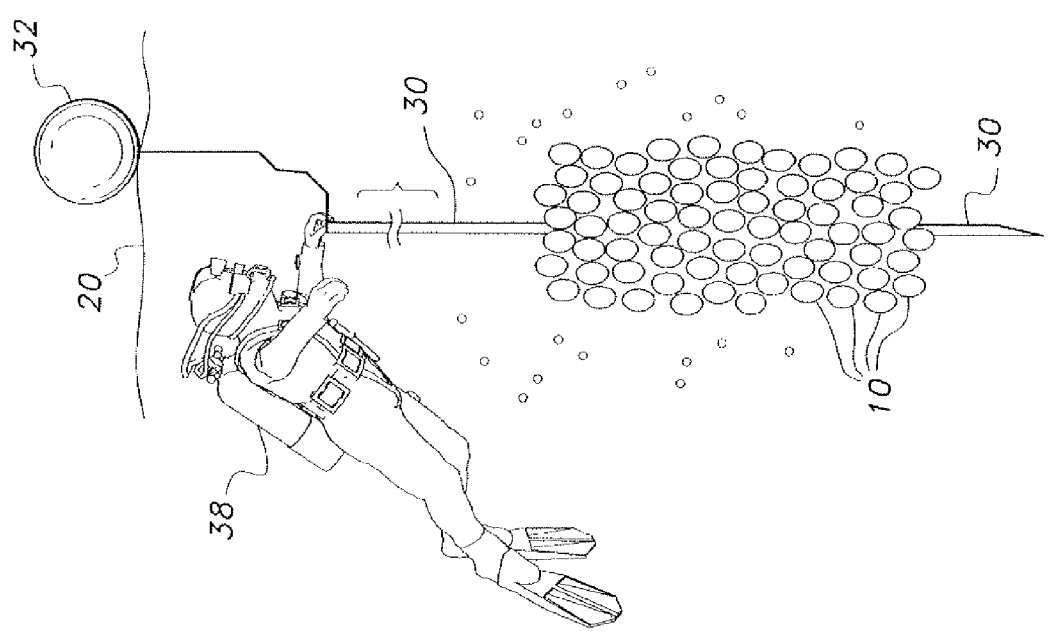
FIG. 7 is an environmental elevation view showing the water aeration capsules and dispensing device of FIG. 4, and another alternative mobile carrier.

FIGS. 5 through 7 provide illustrations of various alternative means for dispensing or deploying the water aeration capsules 10 (or other capsule embodiments 10a, 10b, etc.). In FIG. 5, a mobile carrier comprising a ship 34 is used to lower a container 26 into the water 20 by means of a rope, cable, or other line 28. The operation of the container 26 is essentially as described further above for the embodiment of FIGS. 3A and 3B. In FIG. 6, a rotary wing aircraft, e.g., helicopter 36, is used as the mobile carrier, and the aeration capsule container 26 and line 28 are essentially the same as that shown in FIGS. 3A, 3B, and 5. It will be recognized that a conventional fixed wing aircraft (not shown) may be used as the mobile carrier in lieu of the helicopter 36 of FIG. 6. In FIG. 7, a scuba diver 38 is used as the mobile carrier, along with the rod or stick 30 and float or buoy 32 illustrated in FIG. 4. Such a deployment method might be desirable in certain bodies of water not accessible by larger craft.

FIG. 8 illustrates yet another embodiment wherein a small boat 40 is used to position a float or buoy 32 having a plurality of water aeration capsules 10e suspended from the lower end of a cable, rope, or line 28. The capsules 10e may be adhesively secured to a central carrier 42 by means of water soluble adhesive, as described further above for the embodiment of FIG. 4. The capsules 10e are designated differently than the capsules 10 through 10d of earlier described embodiments, as they utilize an aquatic animal food for their ballast elements. Initially, fish F and other forms of aquatic animal life will not be attracted to the capsules 10e until they are breached to release their aquatic animal food ballast. However, once at least some of the capsules 10e are breached in some manner (dissolution in the water, fracturing under pressure, etc.), the scent of the aquatic animal food ballast will be released, thereby attracting fish F and/or other forms of aquatic animal life as may be present. Thus, the capsules 10e provide the twofold function of aerating the water and also providing nutrition for any aquatic animal life that may be present when the capsules 10e are breached, both of these functions benefiting the population of aquatic animal life in the area.

FIGS. 9A through 11 illustrate several embodiments of gas burial disposal capsules adapted for burying waste gases in the ground. FIGS. 9A and 9B of the drawings respectively provide a front view in section and a front view of a first embodiment of a small gas burial disposal capsule 110a, while FIGS. 9C and 9D illustrate alternative embodiment capsules 110b and 110c. The only difference between the various capsules 110a, 110b, and 110c is their shape or geometric configuration, the basic structure comprising a closed shell surrounding an internal volume containing a gas, which is the same for all of the various configurations or embodiments of the capsule. The capsules in their various embodiments are preferably relatively small, e.g., on the order of an inch or less in diameter or length in order to facilitate their placement underground using various means, the volume of the capsules being substantially less than one liter.

The capsule 110a comprises a thin, closed shell 112a defining a gas-filled internal volume 114a. The corresponding gas burial disposal capsules 110b of FIG. 9C and 110c of FIG. 9D have substantially the same structure, differing only in their geometric shapes. The capsule 110b of FIG. 9C includes a shell 112b enclosing a gas-filled volume 114b, while the capsule 110c of FIG. 9D includes a shell 112c enclosing a gas-filled volume 114c. The shapes of the various gas burial disposal capsules 110a through 110e are exemplary, and it should be understood that virtually any practicable shape may be used to form such a gas burial disposal capsule.

The capsule shell 112a (or 112b, 112c for the capsules 110b, 110c of FIGS. 9C, 9D) may be formed of any suitable material, depending upon the ultimate intended disposition of the gases encapsulated within the shell(s). In many instances, it may be desirable to seal the gases within the capsules for a substantially indefinite period, preventing their escape for the foreseeable future. Accordingly, the capsule shells 112a, 112b, 112e, etc. may be formed of a substantially non-degradable material, such as corrosion-resistant steel (i.e., "stainless" steel) or a non-degradable plastic. Alternatively, it may be desirable that the capsule shells degrade over some approximate period of time, e.g., on the order of a year, or perhaps ten years or a century, etc. Accordingly, the capsule shells may be formed of a degradable metal, plastic, or other material, e.g., mild steel that will eventually rust through, or aluminum that is subject to slow corrosive effects, etc. Various degradable plastics may also be used.

The gas burial disposal capsules 110a, 110b, etc., are intended to be buried at some depth below the surface. It is well known that the weight of the overlying earth results in great subterranean pressures. Accordingly, gas or gases may be introduced into the capsule shells at a pressure at least approximately corresponding to the pressure at the anticipated depth for burial of the capsules. This results in the internal and external pressures substantially canceling one another, thereby relieving stress on the shells 112a, etc. of the capsules and precluding their being crushed by the subterranean pressures at the depth at which they are buried. The capsules may be placed in a pressurized environment as they are filled, and may be kept in such a pressurized environment until buried underground in order to minimize differential pressure stresses on the shells of the capsules.

Figure 11:
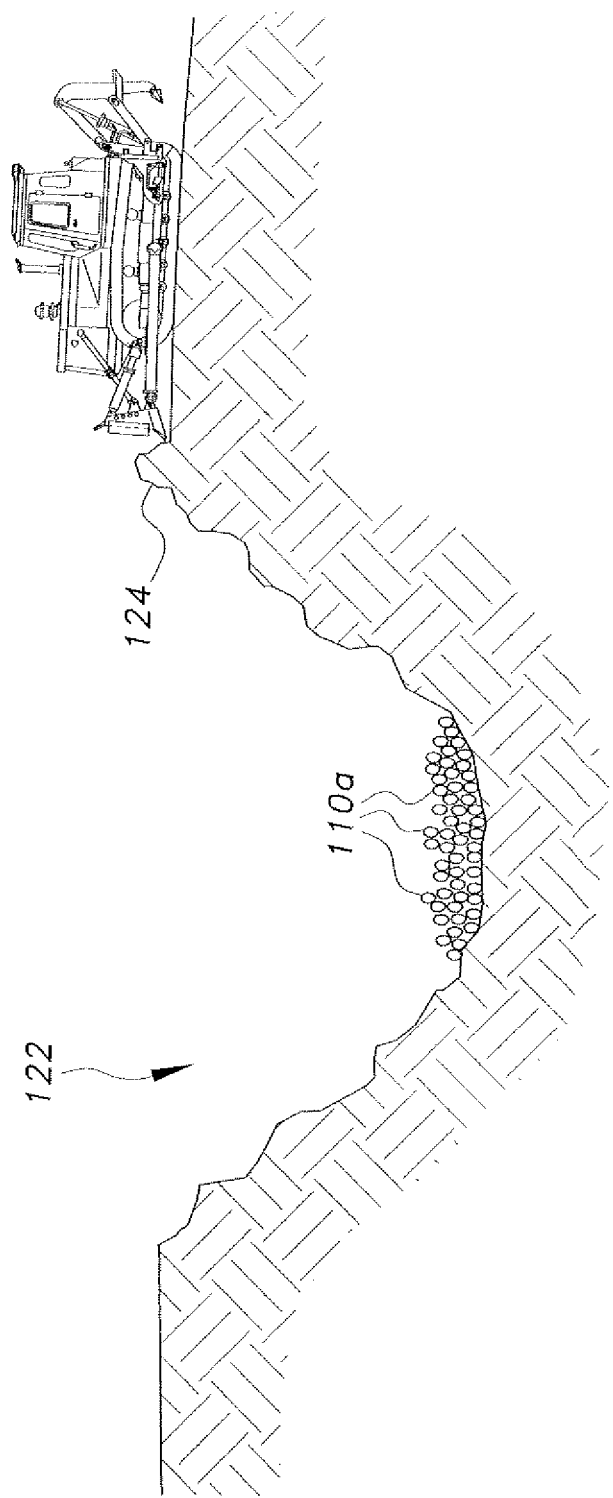

FIGS. 10 and 11 illustrate different means of burying the gas burial disposal capsules of the present invention. In FIG. 10 the capsules, e.g., capsules 110a, although they may comprise any gas burial disposal capsule described above, are shown being pumped by a surface pump 116 through a shaft 118 or the like into a subterranean cavity or pocket 120. The subterranean cavity 120 may comprise a depleted oil or gas deposit or other natural or artificial subterranean cavity. Such subterranean cavities provide an excellent location for the dispersal of the capsules, as they are generally far underground and the single relatively small diameter shaft 118 facilitates the sealing of the capsules deep underground where they are rendered essentially harmless. Even the slow degradation of the capsules, where degradable capsule shells are used, will result in the gases slowly dissipating in the subterranean environment and slowly dispersing over a period of many years, if not centuries.

FIG. 11 illustrates an alternative method of burying the gas burial disposal capsules of the present invention. In FIG. 11, a burial pit 122 has been formed, e.g., in a landfill or other disposal area. The capsules, e.g., capsules 110a, or alternatively, other gas burial disposal capsules described above, have been placed within the pit 122 at some level below the surface. Overburden or fill 124 is then placed over the capsules 110a (or other capsules) to bury them below the surface where they are rendered essentially harmless, particularly where the capsule shells are formed of substantially non-degradable metal, plastic, or other material.

It is to be understood that the present invention is not limited to the embodiments described above, but encompasses any and all embodiments within the scope of the following claims.

I claim:

1. A method of disposing of hazardous gases, comprising the steps of:
   (a) providing a plurality of small gas burial disposal capsules, each of the capsules being free-flowing and including a small, thin, sealed, degradable shell defining an internal volume, the shell being adapted for permanent burial in the ground; and a hazardous gas disposed within the internal volume of the shell, the shell being adapted to release the gas disposed therein over a predetermined period of time; and
   (b) disposing of the capsules beneath the ground, wherein the hazardous gas disposed within the internal volume of the shell provides an internal pressure within the shell, the internal pressure being substantially equal to an external subterranean pressure at a depth at which the capsules are disposed.

2. The method of disposing of hazardous gases according to the method of claim 1, wherein the step of disposing of the capsules beneath the ground further comprises the step of pumping the capsules into a subterranean cavity.

3. The method of disposing of hazardous gases according to the method of claim 1, wherein the step of disposing of the capsules beneath the ground further comprises the steps of:
   (a) providing a burial pit in the surface of the earth;
   (b) placing the capsules in the pit; and
   (c) covering the capsules with earth.

4. A method of disposing of hazardous gas, comprising the steps of:
   encapsulating the hazardous gas in a plurality of capsules, each of the capsules being free-flowing and having a volume less than one liter; and
   burying the capsules belowground, wherein
   said step of encapsulating the hazardous gas includes the step of filling the capsules with the hazardous gas to a pressure substantially equal to a subterranean pressure at a depth at which the capsules are buried.

5. The method of disposing of hazardous gas according to claim 4, wherein said capsules are degradable for slowly releasing the gas belowground.

6. The method of disposing of waste gas according to claim 4, wherein said capsules are non-degradable for permanent burial of the gas.

7. The method of disposing of hazardous gas according to claim 4, wherein said step of burying the capsules comprises the step of pumping the capsules through a shaft extending into the ground to a desired depth.

8. The method of disposing of hazardous gas according to claim 4, wherein said step of burying the capsules comprises the steps of:
   dumping the capsules into a pit; and
   filling the pit with soil.

\* \* \* \* \*